US012647047B2

(12) United States Patent
Zhou et al.

(10) Patent No.: US 12,647,047 B2
(45) Date of Patent: Jun. 2, 2026

(54) MICRO-INVERTER AND GRID-TIED OUTPUT CONTROL METHOD AND DEVICE THEREFOR

(71) Applicant: ALTENERGY POWER SYSTEM INC., Jiaxing (CN)

(72) Inventors: Dongming Zhou, Jiaxing (CN); Yongchun Yang, Jiaxing (CN); Biaojie Qi, Jiaxing (CN); Yuhao Luo, Jiaxing (CN); Kaifeng Jin, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 216 days.

(21) Appl. No.: 18/563,421

(22) PCT Filed: Apr. 2, 2022

(86) PCT No.: PCT/CN2022/084978
§ 371 (c)(1),
(2) Date: Nov. 22, 2023

(87) PCT Pub. No.: WO2022/252800
PCT Pub. Date: Dec. 8, 2022

(65) Prior Publication Data
US 2024/0275306 A1 Aug. 15, 2024

(30) Foreign Application Priority Data
Jun. 3, 2021 (CN) .......................... 202110619296.5

(51) Int. Cl.
*H02M 7/5387* (2007.01)
*H02M 1/12* (2006.01)
*H02M 1/32* (2007.01)

(52) U.S. Cl.
CPC ....... *H02M 7/53871* (2013.01); *H02M 1/126* (2013.01); *H02M 1/32* (2013.01)

(58) Field of Classification Search
CPC ..... H02M 7/53871; H02M 1/126; H02M 1/32
(Continued)

(56) References Cited

U.S. PATENT DOCUMENTS

| | | | | |
|---|---|---|---|---|
| 7,193,872 B2 * | 3/2007 | Siri | ................... | H02M 7/53803 363/95 |
| 9,887,547 B2 * | 2/2018 | Liu | ......................... | H02M 7/42 |

(Continued)

FOREIGN PATENT DOCUMENTS

| | | |
|---|---|---|
| CA | 2510273 A1 | 12/2006 |
| CN | 102638057 A | 8/2012 |

(Continued)

OTHER PUBLICATIONS

The 1st Office Action regarding Chinese Patent Application No. CN202110619296.5, Mailing date: Jan. 24, 2022.
(Continued)

*Primary Examiner* — Yemane Mehari
(74) *Attorney, Agent, or Firm* — Yue (Robert) Xu; Apex Attorneys at Law, LLP

(57) ABSTRACT

A micro-inverter and a grid-tied output control method and device therefor. The micro-inverter comprises an inverter full-bridge circuit and an LC filter circuit. The LC filter circuit is grid-tied to a power grid by means of an output switch. The method comprises: obtaining a voltage amplitude, a frequency, and a phase of a voltage of the power grid by using phase locking; adjusting a power switching transistor driving the inverter full-bridge circuit to cause an output voltage of the micro-inverter to track the voltage of the power grid; and controlling the output switch to be switched on so that the micro-inverter operates normally. In the present application, before the output switch is turned off to grid-tie the micro-inverter, the power grid voltage is
(Continued)

phase-locked and the output voltage of the micro-inverter is controlled to track the power grid voltage.

10 Claims, 9 Drawing Sheets

(58) Field of Classification Search
USPC ........................................................ 363/98
See application file for complete search history.

(56) References Cited

U.S. PATENT DOCUMENTS

| | | | | |
|---|---|---|---|---|
| 2006/0171182 A1* | 8/2006 | Siri | ................... | H02M 3/33592 |
| | | | | 363/131 |
| 2016/0241043 A1* | 8/2016 | Sugimoto | ............. | H02M 7/797 |
| 2017/0155247 A1 | 6/2017 | Liu et al. | | |
| 2019/0245458 A1 | 8/2019 | Wang et al. | | |
| 2020/0144934 A1 | 5/2020 | Chen et al. | | |

FOREIGN PATENT DOCUMENTS

| | | | | | |
|---|---|---|---|---|---|
| CN | 102664545 | A | 9/2012 | | |
| CN | 102723741 | A | 10/2012 | | |
| CN | 102891503 | A | 1/2013 | | |
| CN | 103064023 | A | 4/2013 | | |
| CN | 103078545 | A | 5/2013 | | |
| CN | 103401463 | A | 11/2013 | | |
| CN | 104135034 | A | 11/2014 | | |
| CN | 104701886 | A | 6/2015 | | |
| CN | 105429174 | A | 3/2016 | | |
| CN | 106787911 | A | 5/2017 | | |
| CN | 107257136 | A | 10/2017 | | |
| CN | 107294417 | A | 10/2017 | | |
| CN | 109842154 | A | 6/2019 | | |
| CN | 110048588 | A | 7/2019 | | |
| CN | 110138010 | A | 8/2019 | | |
| CN | 110690830 | A | 1/2020 | | |
| CN | 112510762 | A | 3/2021 | | |
| CN | 113315401 | A | 8/2021 | | |
| EP | 4280411 | A1 | 11/2023 | | |
| JP | 2013110848 | A | 6/2013 | | |
| WO | WO-2014106144 | A1 * | 7/2014 | ............. | H02M 7/48 |

OTHER PUBLICATIONS

International Search Report for PCT/CN2022/084978 mailed Jun. 6, 2022, ISA/CN.

* cited by examiner

S101

Obtain a voltage amplitude, a frequency, and a phase of a voltage of the power grid by using phase locking

S102

Adjust a power switching transistor driving the inverter full-bridge circuit to cause an output voltage of the micro-inverter to track the voltage of the power grid

S103

Control the output switch to be switched on so that the micro-inverter operates normally

MICRO-INVERTER AND GRID-TIED OUTPUT CONTROL METHOD AND DEVICE THEREFOR

The present application is the national phase of International Application No. PCT/CN2022/084948, titled "MICRO-INVERTER AND GRID-TIED OUTPUT CONTROL METHOD AND DEVICE THEREFOR", filed on Apr. 2, 2022, which claims priority to Chinese Patent Application No. 202110619296.5, titled "MICRO-INVERTER AND GRID-TIED OUTPUT CONTROL METHOD AND DEVICE THEREFOR", filed on Jun. 3, 2021 with the China National Intellectual Property Administration, both of which are incorporated herein by reference in their entireties.

FIELD

The present disclosure relates to the technical field of power electronics, and in particular to a micro-inverter and a grid-connected output control method and device therefor.

BACKGROUND

Currently, a discharge problem at the moment of grid connection is not considered in a micro-inverter on the market. Specifically, when an output switch is switched on and the micro-inverter is grid-connected to a power grid, a current loop will be generated instantly due to the significant voltage difference between a voltage on an inner line of the micro-inverter and a voltage on the external power grid. A power switching transistor in a full-bridge circuit of the inverter can be easily damaged by these currents, which will lead to circuit failure. In view of this, providing a solution to the aforementioned technical problems is an urgent concern for those skilled in the art.

SUMMARY

The purpose of the present disclosure is to provide a micro-inverter and a grid-connected output control method and device therefor, to effectively prevent damage to a device caused by a current during grid-connected output, thereby improving the reliability and service life of the inverter.

To solve the aforementioned technical problem, in an aspect, a grid-connected output control method for a micro-inverter is provided according to the present disclosure. The micro-inverter includes an inverter full-bridge circuit and an LC filter circuit, and the LC filter circuit is grid-connected to a power grid through an output switch. The method includes:

obtaining a voltage amplitude, a frequency, and a phase of a voltage of the power grid by using phase locking;

adjusting a power switching transistor driving the inverter full-bridge circuit to cause an output voltage of the micro-inverter to track the voltage of the power grid; and controlling the output switch to be switched on so that the micro-inverter operates normally.

Optionally, after the controlling the output switch to be switched on, the method further includes:

determining whether the output switch has been switched on; and in a case that the output switch has been switched on, adjusting and driving the micro-inverter to operate normally.

Optionally, the adjusting a power switching transistor driving the inverter full-bridge circuit to cause an output voltage of the micro-inverter to track the voltage of the power grid including:

adjusting, based on a calculation result of the voltage of the power grid superimposed with a preset voltage component, the power switching transistor driving the inverter full-bridge circuit; and adjusting the output voltage of the micro-inverter.

Optionally, the preset voltage component is a direct current voltage component with a preset value, and the determining whether the output switch has been switched on includes:

determining whether a unidirectional current exceeding a power frequency cycle exists; and in a case that the unidirectional current exceeding the power frequency cycle exists, determining that the output switch has been switched on.

Optionally, the preset voltage component is an alternating current voltage component with a preset amplitude, and the determining whether the output switch has been switched on includes:

determining whether a voltage difference between the output voltage of the micro-inverter and the voltage of the power grid is eliminated; and in a case that the voltage difference between the output voltage of the micro-inverter and the voltage of the power grid is eliminated, determining that the output switch has been switched on.

Optionally, the output switch is a relay or a contactor.

Optionally, the LC filter circuit includes a first inductor, a first capacitor, and a second inductor sequentially connected in series, the output switch includes a first output switch and a second output switch, the other end of the first inductor is connected to a midpoint of a first bridge arm of the inverter full-bridge circuit, the other end of the second inductor is connected to a midpoint of a second bridge arm of the inverter full-bridge circuit, a connection point between the first inductor and the first capacitor is connected to the first output switch, and a connection point between the first capacitor and the second inductor serves as a second output terminal and is connected to the second output switch.

Optionally, the LC filter circuit includes a first inductor, a first capacitor, a second capacitor, and a second inductor sequentially connected in series, the output switch includes a first output switch and a second output switch, the other end of the first inductor is connected to a midpoint of a first bridge arm of the inverter full-bridge circuit, the other end of the second inductor is connected to a midpoint of a second bridge arm of the inverter full-bridge circuit, a connection point between the first inductor and the first capacitor is connected to the first output switch, a connection point between the first capacitor and the second capacitor is connected to a negative input terminal of the inverter full-bridge circuit, and a connection point between the second capacitor and the second inductor is connected to the second output switch.

In another aspect, a control device is provided according to the present disclosure. The control device includes: a memory, configured to store computer programs; and a processor, configured to execute the computer program to implement steps of any one of the aforementioned grid-connected output control methods.

In another aspect, a micro-inverter is provided. The micro-inverter includes: an inverter full-bridge circuit, an LC filter circuit, and the aforementioned control device.

The beneficial effect of the micro-inverter, the grid-connected output control method and the control device provided according to the present disclosure is that, before the output switch is switched on to grid-connect the micro-inverter, the voltage of the power grid is first phase-locked and the output voltage of the micro-inverter is controlled to track the voltage of the power grid, so that damage to the power switching transistor caused by the current at the moment when the output switch is switched on can be effectively avoided, thereby effectively improving the reliability and service life of the micro-inverter.

BRIEF DESCRIPTION OF THE DRAWINGS

In order to provide a clearer explanation of the prior art and the technical solution in the embodiments of the present disclosure, a brief introduction will be given to the accompanying drawings required in the description of the prior art and the embodiments of the present disclosure. Of course, the accompanying drawings describing the embodiments of the present disclosure are only a portion of the embodiments in the present disclosure. For those skilled in the art, they can also obtain other drawings based on the provided drawings without creative labor, and the obtained other drawings also fall within the scope of protection of the present disclosure.

DETAILED DESCRIPTION

The core of the present disclosure is to provide a micro-inverter and a grid-connected output control method and device, to effectively prevent damage to a device caused by a current during grid-connected output, thereby improving the reliability and service life of the inverter.

In order to provide a clearer and more complete description of the technical solution in the embodiments of the present disclosure, the following will introduce the technical solution in the embodiments of the present disclosure in conjunction with the accompanying drawings. Based on the embodiments in this disclosure, all other embodiments obtained by those skilled in the art without creative labor fall within the scope of protection in the present disclosure.

Figure 1:
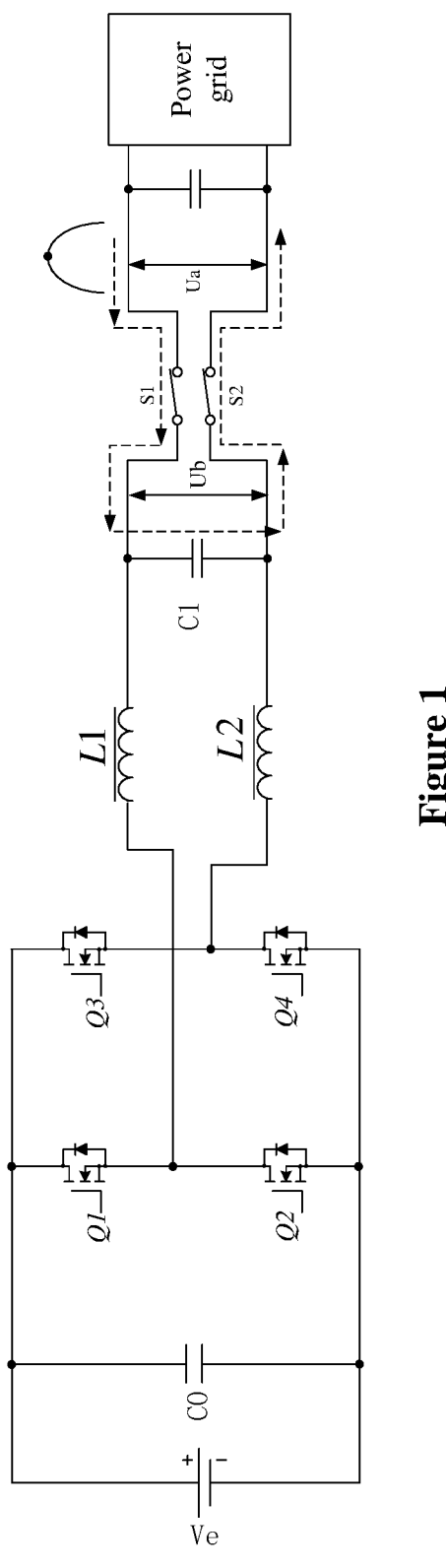
FIG. 1 is a schematic diagram of a current circuit output by a micro-inverter when connected to a power grid during a positive half cycle of a voltage of the power grid according to an embodiment of the present disclosure.
Figure 2:
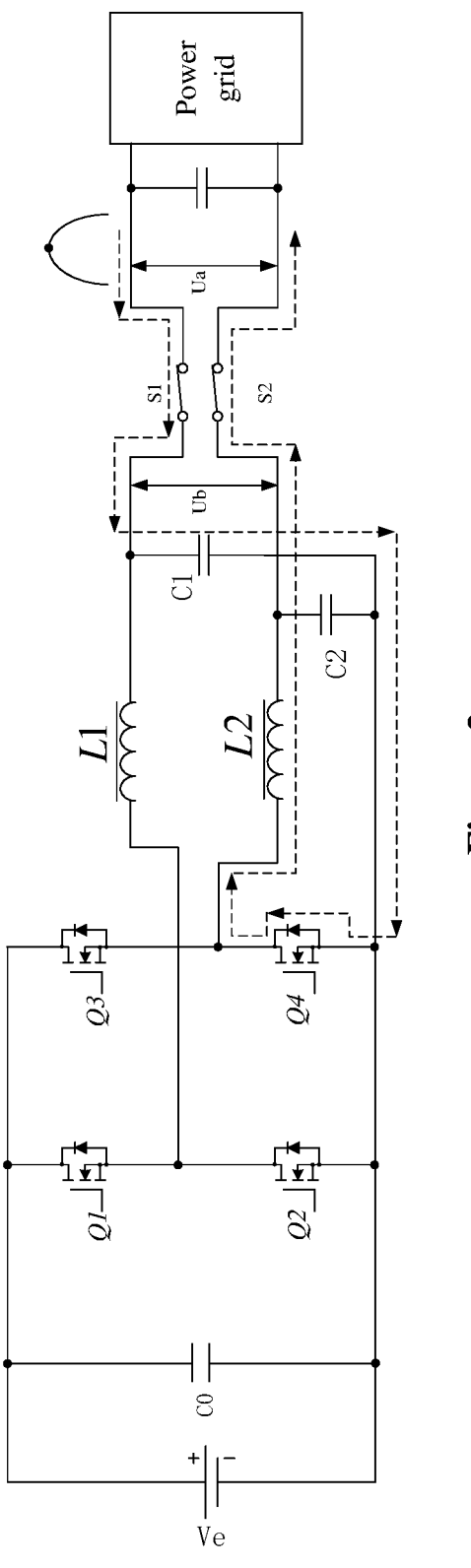
FIG. 2 is a schematic diagram of a current circuit output by a micro-inverter when connected to a power grid during a positive half cycle of a voltage of the power grid according to another embodiment of the present disclosure.

As mentioned in BACKGROUND, when an output switch is switched on and the micro-inverter is integrated into a power grid, a current loop will be generated instantly due to a large voltage difference between a voltage on an inner line of the micro-inverter and an external power grid voltage. When the output switch is switched on during a positive half cycle of the voltage of the power grid, the generated current circuit can be seen in FIG. 1 and FIG. 2. FIG. 1 and FIG. 2 respectively show two different circuit structures of the micro-inverter. When the output switch is switched on during a negative half cycle of the voltage of the power grid, the generated current circuit can be seen in FIG. 3 and FIG. 4.

In order to avoid the damage of a power switching transistor in the inverter full-bridge circuit caused by the current circuit mentioned above, the present disclosure provides a grid-connected output control method for a micro-inverter, which can effectively solve the above problems.

Figure 5:
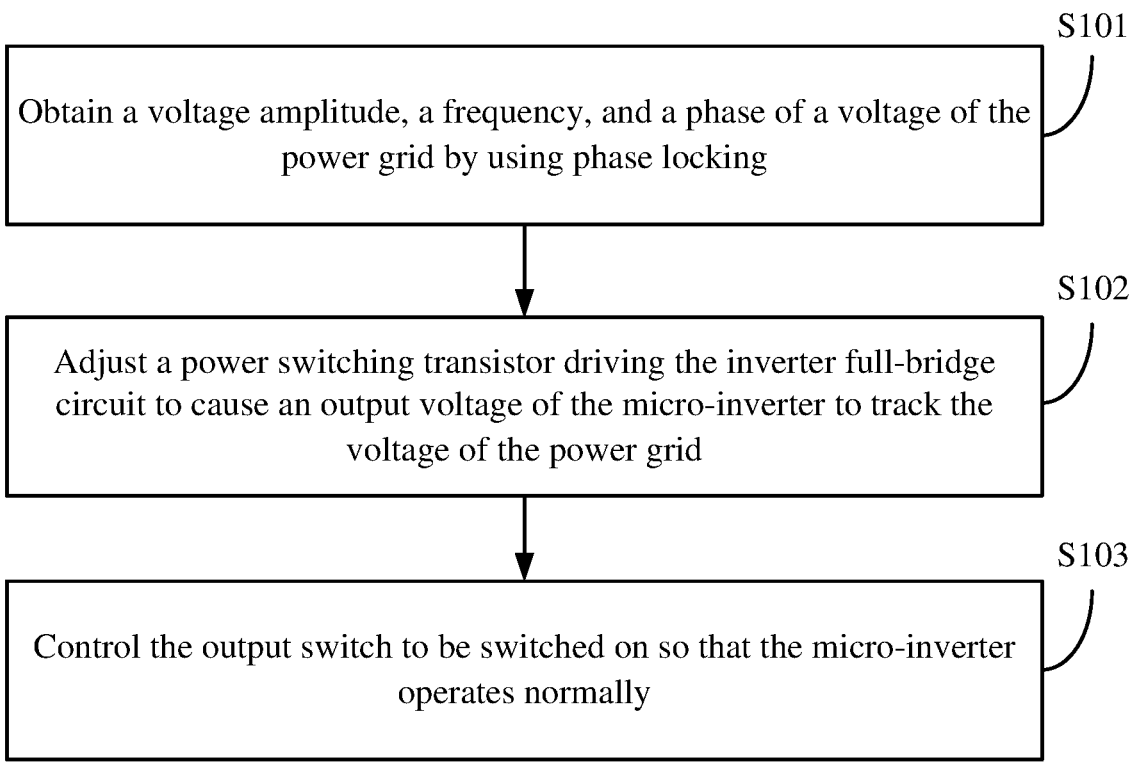
FIG. 5 is a flowchart of a grid-connected output control method for a micro-inverter according to an embodiment of the present disclosure.

As shown in FIG. 5, a grid-connected output control method for a micro-inverter is provided according to an embodiment of the present disclosure. The micro-inverter includes an inverter full-bridge circuit and an LC filter circuit, and the LC filter circuit is grid-connected to a power grid through an output switch. The method includes the following steps S101 to S103.

In step S101, a voltage amplitude, a frequency, and a phase of a voltage of the power grid is obtained by using phase locking.

In step S102, a power switching transistor driving the inverter full-bridge circuit is adjusted to cause an output voltage of the micro-inverter to track the voltage of the power grid.

In step S103, the output switch is controlled to be switched on so that the micro-inverter operates normally.

Figure 6:
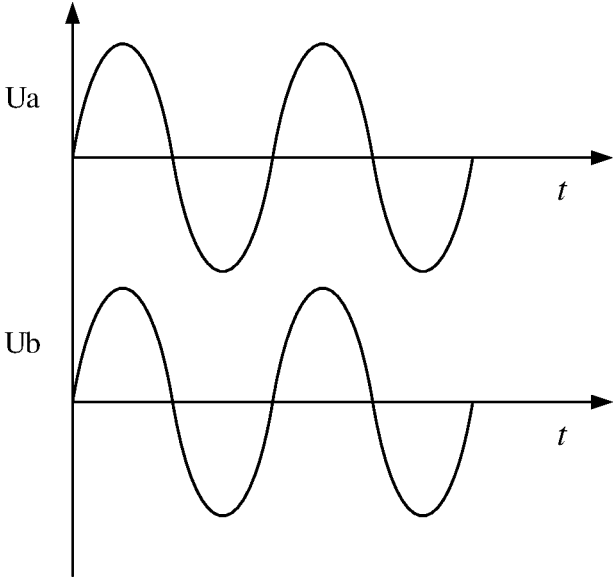
FIG. 6 is a schematic diagram of output voltage tracking of a micro-inverter according to an embodiment of the present disclosure.

Specifically, it should be pointed out that, in the grid-connected output control method of the micro-inverter provided in the embodiment of the present disclosure, before the output switch of the micro-inverter is switched on, the voltage of the power grid is first phase-locked. By controlling the working state of the inverter full-bridge circuit, the output voltage of the micro-inverter is controlled to be as close to the voltage of the power grid as possible in real time. Reference is made to FIG. 6 for details, where Ua is the voltage of the power grid and Ub is the output voltage of the micro-inverter.

In this way, when the output voltage of the micro-inverter stabilizes and approaches the voltage of the power grid, the output switch of the micro-inverter connected to the power grid is switched on, and there will no longer be a large internal and external voltage difference and a large instantaneous current, which can effectively prevent damage to electronic devices. After the output switch is switched on, the output voltage of the micro-inverter can no longer be controlled to track the voltage of the power grid, and can be controlled to operate normally according to actual needs.

It should be noted that, since the voltage of the power grid is alternating current, in order to facilitate tracking and outputting the voltage of the power grid, a modulation method of the inverter full-bridge circuit can be specifically selected as a bipolar modulation control method. Moreover, in order to reduce losses and improve efficiency, a duty cycle and an opening time of the power switching transistor in the inverter full-bridge circuit can be limited as much as possible, so that it is as small as possible, as long as a capacitor in the LC filter circuit can be charged so that the output voltage can track the voltage of the power grid.

It can be seen that, in the grid-connected output control method for the micro-inverter provided in embodiment of the present disclosure, before the output switch is switched on to grid-connect the micro-inverter, the voltage of the power grid is first phase-locked and the output voltage of the micro-inverter is controlled to track the voltage of the power grid, so that damage to the power switching transistor caused by the current at the moment when the output switch is switched on can be effectively avoided, thereby effectively improving the reliability and service life of the micro-inverter.

Figure 3:
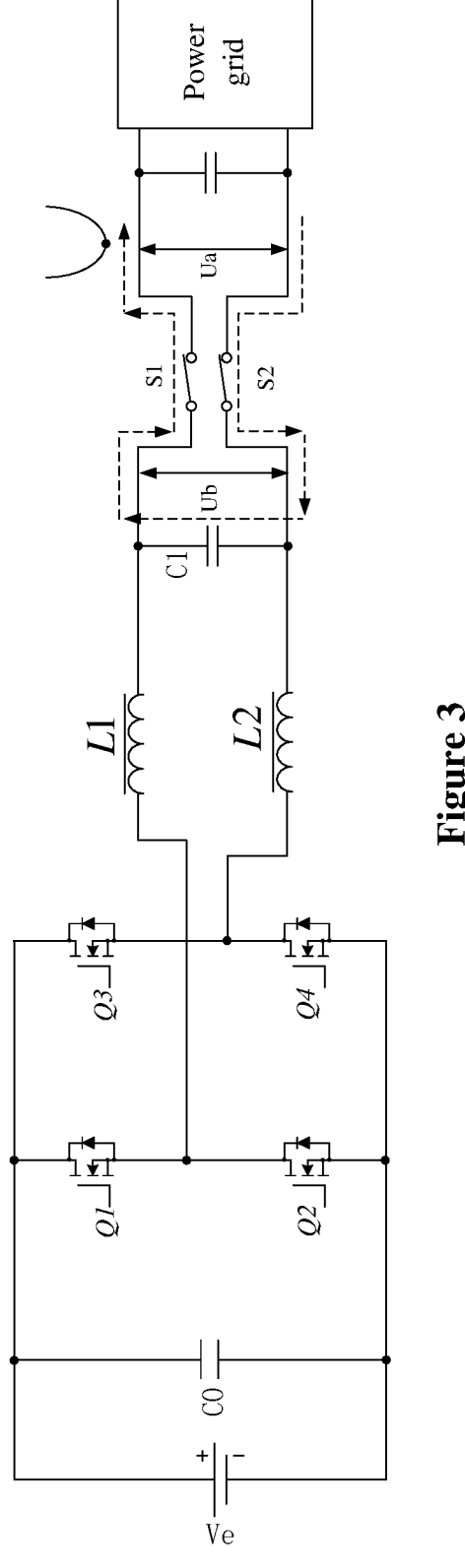
FIG. 3 is a schematic diagram of a current circuit output by a micro-inverter when connected to a power grid during a negative half cycle of a voltage of the power grid according to an embodiment of the present disclosure.

On the basis of the above, the present disclosure also provides a specific circuit structure of a micro-inverter, which can be referenced in FIG. 1 or FIG. 3. Where Ve is a direct current power supply, C0 is a voltage stabilizing capacitor, and power switching transistors Q1, Q2, Q3, and Q4 form the inverter full-bridge circuit.

In this specific embodiment, the LC filter circuit includes a first inductor L1, a first capacitor C1, and a second inductor L2 sequentially connected in series. The output switch includes a first output switch S1 and a second output switch S2. The other end of the first inductor L1 is connected to a midpoint of a first bridge arm of the inverter full-bridge circuit. The other end of the second inductor L2 is connected to a midpoint of the second bridge arm of the inverter full-bridge circuit. A connection point between the first inductor L1 and the first capacitor C1 is connected to the first output switch S1. A connection point between the first capacitor C1 and the second inductor L2 serves as a second output terminal and is connected to the second output switch S2.

Figure 4:
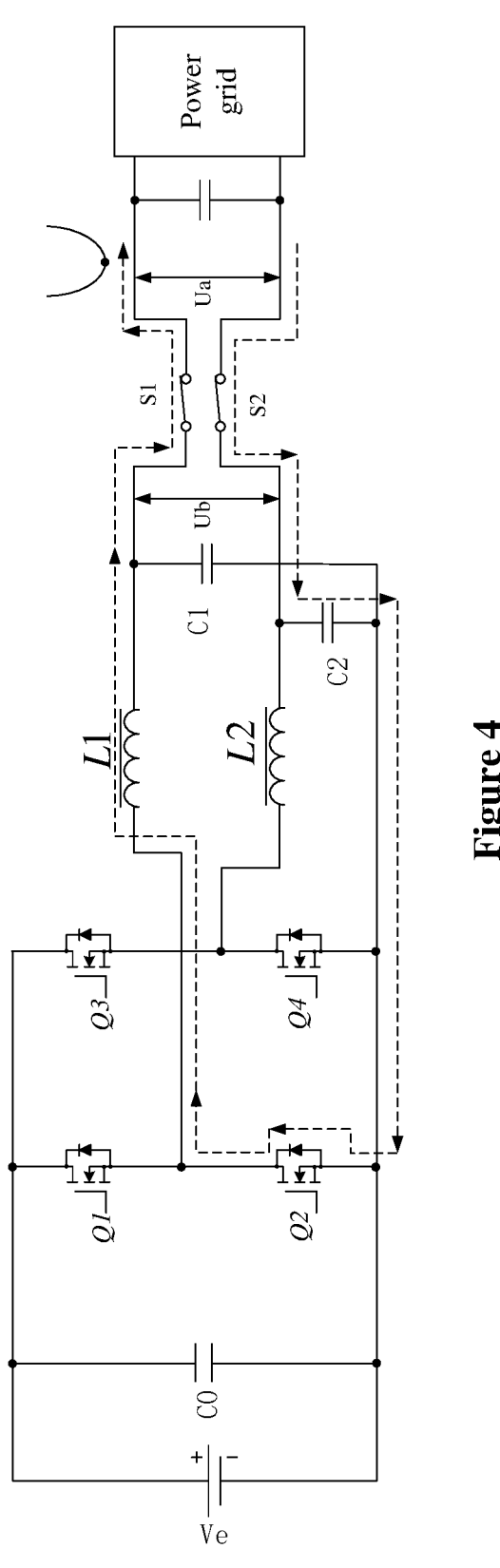
FIG. 4 is a schematic diagram of a current circuit output by a micro-inverter when connected to a power grid during a negative half cycle of a voltage of the power grid according to another embodiment of the present disclosure.

The present disclosure also provides a specific circuit structure of another micro-inverter, which can be referenced in FIG. 2 or FIG. 4.

In this specific embodiment, the LC filter circuit includes a first inductor L1, a first capacitor C1, a second capacitor C2, and a second inductor L2 sequentially connected in series. The output switch includes a first output switch S1 and a second output switch S2. The other end of the first inductor L1 is connected to a midpoint of a first bridge arm of the inverter full-bridge circuit. The other end of the second inductor L2 is connected to a midpoint of a second bridge arm of the inverter full-bridge circuit. A connection point between the first inductor L1 and the first capacitor C1 is connected to the first output switch S1. A connection point between the first capacitor C1 and the second capacitor C2 is connected to a negative input terminal of the inverter full-bridge circuit. A connection point between the second capacitor C2 and the second inductor L2 is connected to the second output switch S2.

On the basis of the above, in the grid-connected output control method of the micro-inverter according to the present disclosure, as a specific embodiment, the output switch is specifically a relay or a contactor.

On the basis of the above, in the grid-connected output control method of the micro-inverter according to the present disclosure, as a specific embodiment, after the output switch is controlled to be switched on, the method further includes:

determining whether the output switch has been switched on; and in a case that the output switch has been switched on, adjusting and driving the micro-inverter to operate normally.

Specifically, since it is only after the output switch is switched on that the inverter full-bridge circuit can exit a working mode of tracking the voltage of the power grid and switch to a normal operation mode, in order to ensure that the output switch has been indeed switched on according to a switch-on command, a switch-on state of the output switch is further detected according to an embodiment of the present disclosure.

On the basis of the above, in the grid-connected output control method of the micro-inverter according to the present disclosure, as a specific embodiment, the adjusting the power switching transistor driving the inverter full-bridge circuit to cause the output voltage of the micro-inverter to track the voltage of the power grid including:

adjusting, based on a calculation result of the voltage of the power grid superimposed with a preset voltage component, the power switching transistor driving the inverter full-bridge circuit; and adjusting the output voltage of the micro-inverter.

Figure 7:
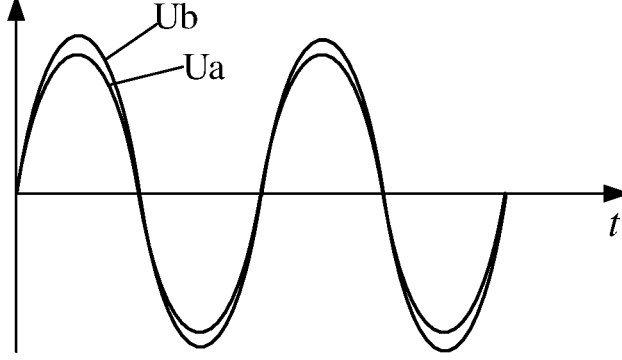
FIG. 7 is a schematic diagram of output voltage tracking of a micro-inverter according to another embodiment of the present disclosure.

Specifically, reference is made to FIG. 7. In order to facilitate the judgment of whether the output switch has been completed switched on according to the switch-on command, the output voltage is not required to be completely equal to the voltage of the power grid when controlling the output voltage to track the voltage of the power grid in the present disclosure. Instead, the output voltage is superimposed with a preset voltage component on top of the voltage of the power grid, and then the different voltages can be used to help determine the switch-on state of the output switch.

Figure 8:
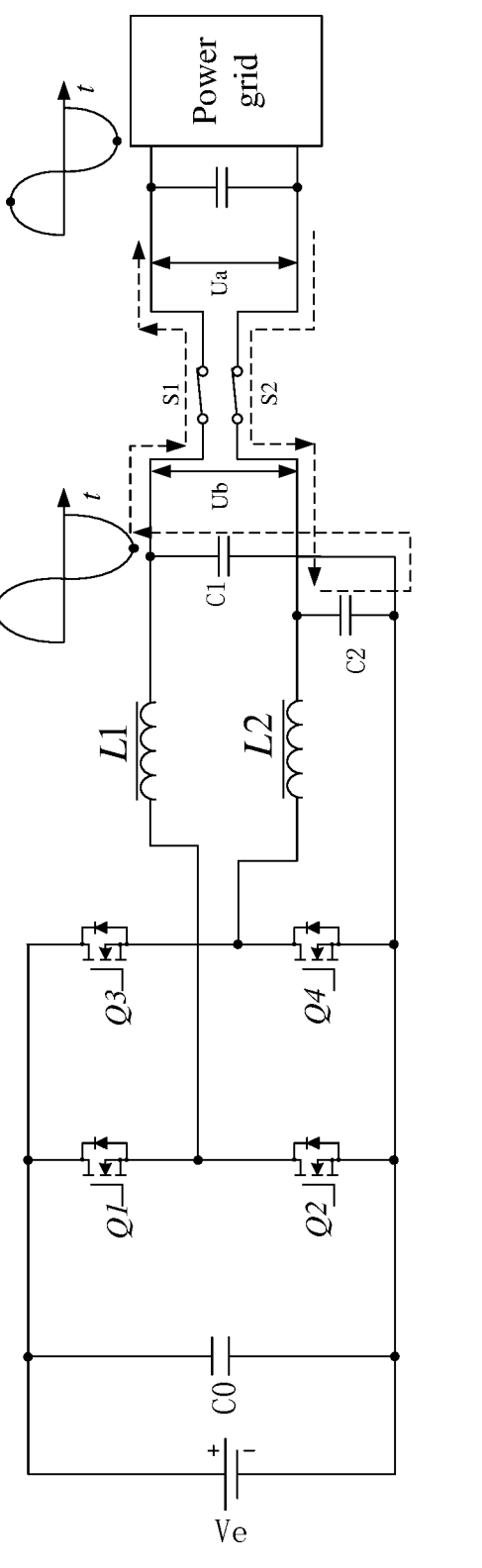
FIG. 8 is a schematic diagram of an effect of a grid-connected output control method for a micro-inverter according to an embodiment of the present disclosure.

At this point, as shown in FIG. 8, due to the fact that Ub and Ua are alternating current voltages of the same frequency and phase, and an amplitude of Ub is greater than an amplitude of Ua, when the output switch is switched on, the output voltage is greater than the voltage of the power grid. The current flows back to the power grid through capacitors C1 and C2, without passing through the inverter full-bridge circuit, thereby effectively protecting the power switch transistor.

On the basis of the above, in the grid-connected output control method of the micro-inverter according to the present disclosure, as a specific embodiment, the preset voltage component is an alternating current voltage component with a preset amplitude, and the determining whether the output switch has been switched on includes:

determining whether a voltage difference between the output voltage of the micro-inverter and the voltage of the power grid is eliminated; and in a case that the voltage difference between the output voltage of the micro-inverter and the voltage of the power grid is eliminated, determining that the output switch has been switched on.

Specifically, in the embodiment as shown in FIG. 7, the superimposed preset voltage component Δd is specifically the alternating current voltage. Of course, an amplitude of the alternating current voltage is relatively small, which can be specifically a small alternating current bias positive voltage $\Delta d = \sin(\omega t)$ or a small current bias negative voltage $\Delta d = \cos(\omega t)$. Due to the existence of the fixed alternating current error, the output voltage of the micro-inverter is not equal to the voltage of the power grid before the output switch is switched on. After the output switch is switched on, the output voltage of the micro-inverter is clamped to the voltage of the power grid, and the two are equal. Therefore, after detecting the elimination of voltage difference, it can be determined that the output switch is switched on. Similarly, due to the short judgment time, small accumulation of unidirectional current, and the ability to quickly switch to the normal operating mode of the inverter, this process has a relatively small current impact on the power switch transistor of the inverter.

On the basis of the above, in the grid-connected output control method of the micro-inverter according to the present disclosure, as a specific embodiment, the preset voltage component is a direct current voltage component with a preset value, and the determining whether the output switch has been switched on includes:

determining whether a unidirectional current exceeding a power frequency cycle exists; and in a case that the unidirectional current exceeding the power frequency cycle exists, determining that the output switch has been switched on.

Figure 9:
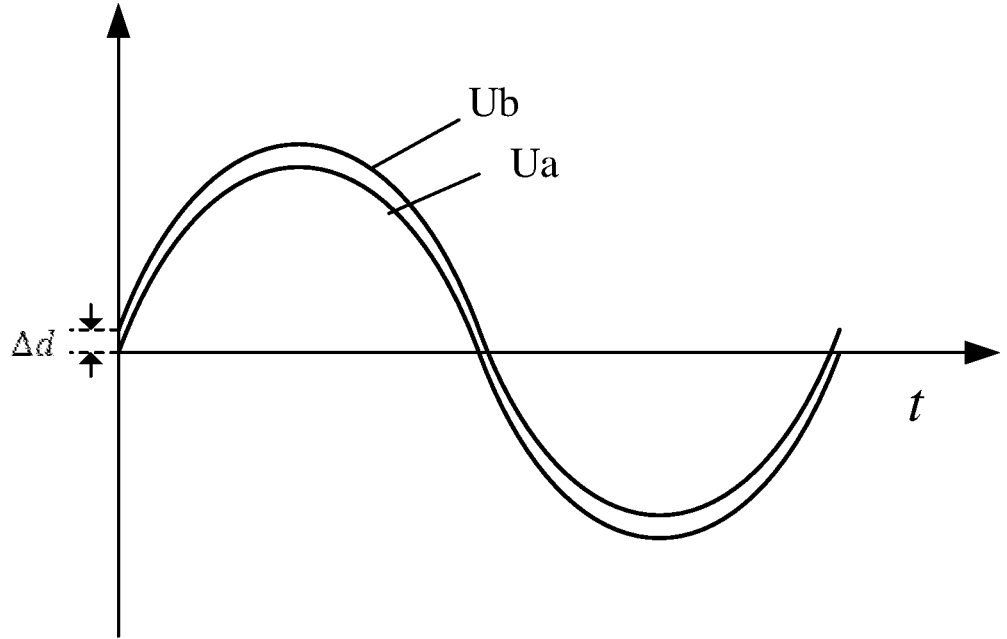
FIG. 9 is a schematic diagram of output voltage tracking of a micro-inverter according to another embodiment of the present disclosure.
Figure 10:
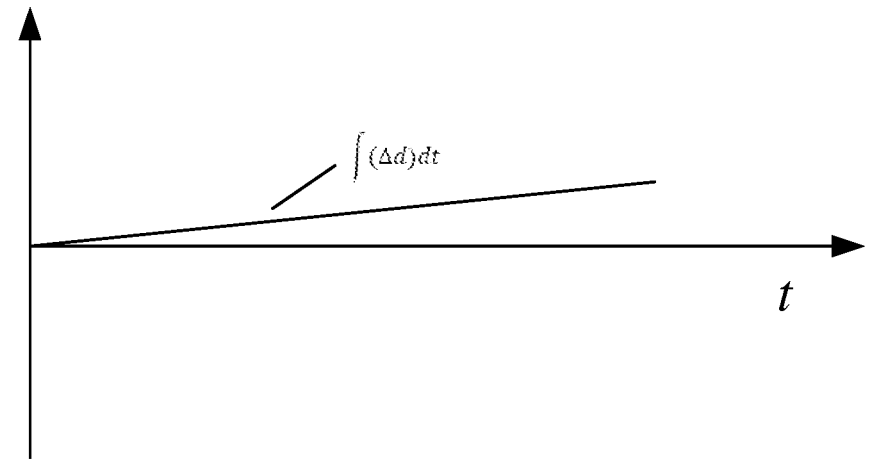
FIG. 10 is a schematic diagram of an offset current curve corresponding to FIG. 9 according to an embodiment of the present disclosure.

Specifically, in this embodiment, the superimposed preset voltage component Δd is the direct current voltage. Of course, the direct current voltage component is a very small constant and results in a fixed direct current error between Ub and Ua, as shown in FIG. 9. After the output switch is switched on, due to the presence of the fixed direct current error, under the software control integration accumulation in the control device, it will be reflected as a biased current curve, as shown in FIG. 10. Therefore, when detecting unidirectional currents exceeding the power frequency cycle, it can be determined that the output switch is in the switch-on state. It should be noted that, due to the short judgment time, small accumulation of unidirectional current, and the ability to quickly switch to the normal operating mode of the inverter, this process has a relatively small current impact on the power switch transistor of the inverter.

Figure 11:
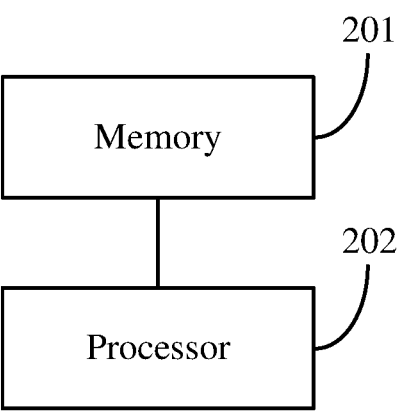
FIG. 11 is a structural block diagram of a control device for a micro-inverter according to an embodiment of the present disclosure.

As shown in FIG. 11, a control device for a micro-inverter is provided according to an embodiment of the present disclosure, and the control device mainly includes a memory 201 and a processor 202.

The memory 201 is configured for storing computer programs.

The processor 202 is configured for executing the computer programs to implement the steps of any one of the aforementioned grid-connected output control methods.

A micro-inverter is further provided according to an embodiment of the present disclosure, and the micro-inverter includes an inverter full-bridge circuit, an LC filter circuit, and the aforementioned control device.

For the specific content of the above control device and micro-inverter, reference is made to the detailed introduction of the grid-connected output control method of the micro-inverter, which will not be repeated here.

The various embodiments in the present disclosure are described in a progressive manner, and each embodiment focuses on the differences from other embodiments. The same and similar parts between each embodiment can be referred to each other. For the devices disclosed in the embodiments, as they correspond to the methods disclosed in the embodiments, the description is relatively simple. Referenced is made to the method section for relevant information.

It should also be noted that, in the present disclosure, relational terms such as "first" and "second" are only used to distinguish one entity or operation from another entity or operation, and do not necessarily require or imply any actual relationship or order between these entities or operations. In addition, the terms "including", "comprising", or any other variation thereof are intended to cover non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above provides a detailed introduction to the technical solution provided in the present disclosure. This article applies specific examples to explain the principles and implementation methods of the present disclosure, and the explanations of the above examples are only used to help understand the methods and core ideas of the present disclosure. It should be pointed out that for those skilled in the art, without departing from the principles of the present disclosure, several improvements and modifications can be made to the present disclosure, which also fall within the scope of protection of the present disclosure.

The invention claimed is:

1. A grid-connected output control method for a micro-inverter, wherein the micro-inverter comprises an inverter full-bridge circuit and an LC filter circuit, and the LC filter circuit is grid-connected to a power grid through an output switch;

wherein the method comprises:

obtaining a voltage amplitude, a frequency, and a phase of a voltage of the power grid by using phase locking, when the output switch is switched off;

adjusting a power switching transistor driving the inverter full-bridge circuit to cause an output voltage of the micro-inverter to track the voltage of the power grid; and controlling the output switch to be switched on when the output voltage of the micro-inverter tracks the voltage of the power grid, so that the micro-inverter operates normally.

2. The grid-connected output control method according to claim 1, wherein after the controlling the output switch to be switched on, the method further comprises:

determining whether the output switch has been switched on; and in a case that the output switch has been switched on, adjusting and driving the micro-inverter to operate normally.

3. The grid-connected output control method according to claim 2, wherein the adjusting a power switching transistor driving the inverter full-bridge circuit to cause an output voltage of the micro-inverter to track the voltage of the power grid comprising:

adjusting, based on a calculation result of the voltage of the power grid superimposed with a preset voltage component, the power switching transistor driving the inverter full-bridge circuit; and adjusting the output voltage of the micro-inverter.

4. The grid-connected output control method according to claim 3, wherein the preset voltage component is a direct current voltage component with a preset value;

wherein the determining whether the output switch has been switched on comprises:

determining whether a unidirectional current exceeding a power frequency cycle exists; and in a case that the unidirectional current exceeding the power frequency cycle exists, determining that the output switch has been switched on.

5. The grid-connected output control method according to claim 3, wherein the preset voltage component is an alternating current voltage component with a preset amplitude;

wherein the determining whether the output switch has been switched on comprises:

determining whether a voltage difference between the output voltage of the micro-inverter and the voltage of the power grid is eliminated; and in a case that the voltage difference between the output voltage of the micro-inverter and the voltage of the power grid is eliminated, determining that the output switch has been switched on.

6. The grid-connected output control method according to claim 1, wherein the output switch is a relay or a contactor.

7. The grid-connected output control method according to claim 6, wherein the LC filter circuit comprises a first inductor, a first capacitor, and a second inductor sequentially connected in series;

the output switch comprises a first output switch and a second output switch;

the other end of the first inductor is connected to a midpoint of a first bridge arm of the inverter full-bridge circuit;

the other end of the second inductor is connected to a midpoint of a second bridge arm of the inverter full-bridge circuit;

a connection point between the first inductor and the first capacitor is connected to the first output switch; and a connection point between the first capacitor and the second inductor serves as a second output terminal and is connected to the second output switch.

8. The grid-connected output control method according to claim 6, wherein the LC filter circuit comprises a first inductor, a first capacitor, a second capacitor, and a second inductor sequentially connected in series;

the output switch comprises a first output switch and a second output switch;

the other end of the first inductor is connected to a midpoint of a first bridge arm of the inverter full-bridge circuit;

the other end of the second inductor is connected to a midpoint of a second bridge arm of the inverter full-bridge circuit;

a connection point between the first inductor and the first capacitor is connected to the first output switch;

a connection point between the first capacitor and the second capacitor is connected to a negative input terminal of the inverter full-bridge circuit; and a connection point between the second capacitor and the second inductor is connected to the second output switch.

9. A control device, comprising:

a non-transitory memory, configured to store computer programs; and a processor, configured to execute the computer program to implement a grid-connected output control method for a micro-inverter;

wherein the micro-inverter comprises an inverter full-bridge circuit and an LC filter circuit, and the LC filter circuit is grid-connected to a power grid through an output switch;

wherein the method comprises:

obtaining a voltage amplitude, a frequency, and a phase of a voltage of the power grid by using phase locking, when the output switch is switched off;

adjusting a power switching transistor driving the inverter full-bridge circuit to cause an output voltage of the micro-inverter to track the voltage of the power grid; and controlling the output switch to be switched on when the output voltage of the micro-inverter tracks the voltage of the power grid, so that the micro-inverter operates normally.

10. A micro-inverter, comprising: an inverter full-bridge circuit, an LC filter circuit, and a control device;

wherein the control device comprises:

a non-transitory memory, configured to store computer programs; and a processor, configured to execute the computer program to implement a grid-connected output control method for the micro-inverter;

wherein the LC filter circuit is grid-connected to a power grid through an output switch;

wherein the method comprises:

obtaining a voltage amplitude, a frequency, and a phase of a voltage of the power grid by using phase locking, when the output switch is switched off;

adjusting a power switching transistor driving the inverter full-bridge circuit to cause an output voltage of the micro-inverter to track the voltage of the power grid; and controlling the output switch to be switched on when the output voltage of the micro-inverter tracks the voltage of the power grid, so that the micro-inverter operates normally.

* * * * *